Patented Feb. 16, 1926.

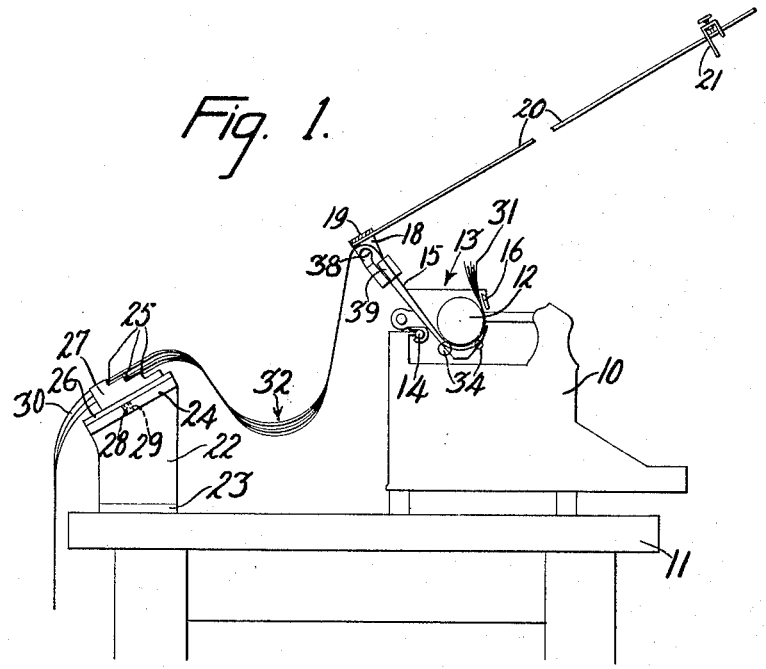
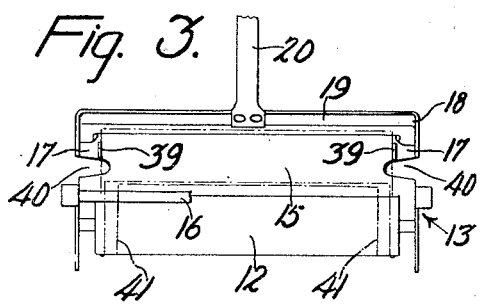
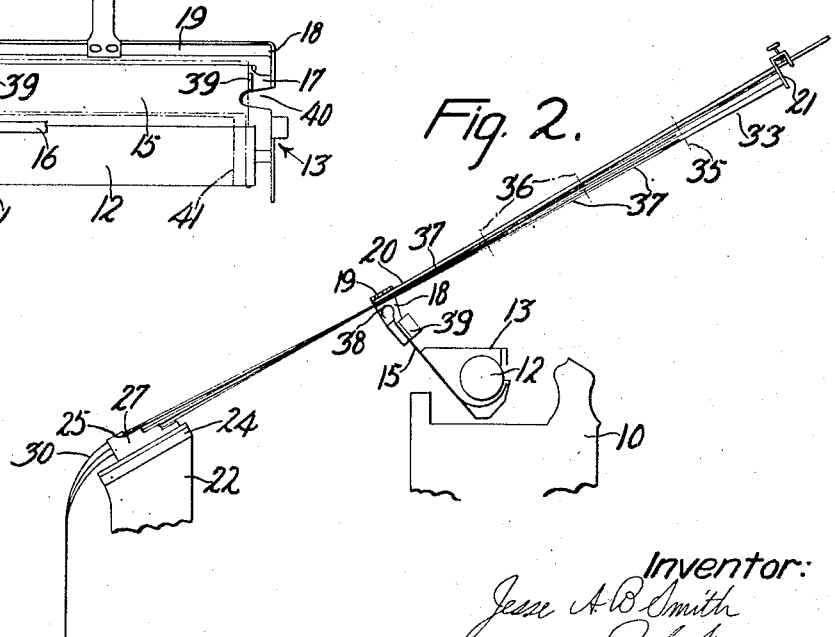

1,572,904

UNITED STATES PATENT OFFICE.

JESSE A. B. SMITH, OF STAMFORD, CONNECTICUT, ASSIGNOR TO UNDERWOOD TYPEWRITER COMPANY, OF NEW YORK, N. Y., A CORPORATION OF DELAWARE.

TYPEWRITING MACHINE.

Application filed May 25, 1922. Serial No. 563,501.

*To all whom it may concern:*

Be it known that I, JESSE A. B. SMITH, a citizen of the United States, residing in Stamford, in the county of Fairfield and State of Connecticut, have invented certain new and useful Improvements in Typewriting Machines, of which the following is a specification.

The present invention relates to typewriting machine auxiliaries and attachments for continuous billing; and to the art of feeding through the machine a continuous work-piece or web, composed of connected individual forms or sections, in several plies interleaved with carbons which have a line-space feed with the web during the typing of a form or section thereof; and with respect to which the web is thereafter advanced to interleave the carbons with a succeeding web-form or section; the feed of the carbons with the web and the shift of the same with respect to the web being alternated repeatedly so long as desired, or until the web is exhausted.

For holding the carbons, and to provide for a line-space feed of the same with the web, and for a backward shift of the same along the web, a carriage, movable forward and backward with respect to the platen, has heretofore been provided. This carriage has also been movable in letter-feed and return directions with the platen carriage; thus involving additions to and modifications of the standard machine structure.

A feature of the invention is a continuous billing attachment usable in connection with a standard typewriting machine; that is to say, an attachment or auxiliary of which the carbon-holder may be free of the platen carriage, and of mechanical connections to the machine, so that a standard machine may, when desired, be used for contonous billing work without modification thereoof.

A feature of the invention is the provision of a fixable carbon-holder, separated from the machine; and of means for holding and guiding the web and interleaved carbons on the fixed carbon-holder and on the movable platen carriage; such that, in the typing operation, the web, though connected to the stationary carbon-holder, may swing edgewise back and forth with the carriage, as the latter travels to and fro, and have line-space feed with the platen; a loop or slack being provided for in the web between the stationary carbon-holder and the carriage, to permit such swinging, and to provide a length or supply of loose web and carbon sufficient for the line-spacing operations incident to the typing of one form.

A further feature of the invention is a method of holding, feeding, guiding and manipulating a continuous web and interleaved carbon-sheets for continuous billing in a standard typewriting machine.

A feature of the invention is a novel means and method for releasing and clearing the web and carbons from the platen; without displacement of the latter, after a form-section has been typed; and, while the platen remains in normal position, for advancing a measured length of the web with respect to the carbons, preliminary to typing on the next form-section.

Other features of the invention are means on the platen carriage for causing the web and carbons (coming from the fixed carbon-holder) to be fed to the platen in a direction at right angles to the latter, whatever the letter-space or lateral position of the platen carriage on the main frame of the machine; and means enabling the operator, without forcing his finger between the web and the usual paper-shelf, to seize the web, front and back, between his fingers, to lift the same from the shelf, to draw it from the platen and to advance it with respect to the carbons.

Other features and advantages will hereinafter appear.

In the accompanying drawings,

Figure 1 is a view, in side elevation, of a typewriting machine and continuous billing attachment in operative relation thereto on a stand; the work-sheet webs being shown in position for printing.

Figure 2 is a view, similar to Figure 1, showing the position to which the webs (released from the platen) are drawn after the leading section thereof has been written in, and preliminary to the detachment of such written leading section and placement of the succeeding section.

Figure 3 is a view, in front elevation, of the platen-carriage with the web-guiding shelf and gage thereon.

Referring to the drawings, the typewriting machine 10 is shown as supported at the front of a stand 11. The platen 12 is shown as revolubly mounted in the carriage 13, which runs on a rail 14 on the main frame of the typewriting machine. On the platen-frame is the usual shelf or paper guide and apron 15 extending from the rear of the platen down around the same to a position somewhat below the printing line. Also on the platen-frame, above the printing line, is shown a knife 16 against which the webs may be drawn to sever the leading sections thereof. The paper-guide 15 has secured at 17 to the sides thereof, in any suitable manner, a yoke 18, to the cross-piece 19 of which is riveted a gage-bar 20 having slidably mounted and adjustably fixable thereon a gage-piece 21, against which the leading ends of the web may be drawn, as indicated in Figure 2, for the purposes hereinafter described, after the leading section thereof has been written in. Except for the knife-blade 16, the yoke 18 with its gage-attachment, and the slight alteration of cutting suitable recesses 40 in the apron 15, the machine illustrated in the drawings is an Underwood standard typewriting machine.

On the stand 11, at the rear of the typewriting machine and preferably centered with respect thereto, is a standard for the carbon-holder. This standard comprises side-plates 22 having flanges 23 on which they may be screwed or otherwise fixed upon the table platform, and a cross-plate 24 which connects the plates 22. The plate 24 serves as a platform for a carbon-holder 25. This carbon-holder may be of the style shown in United States Letters Patent to Fortin, No. 1,237,319, granted August 21, 1917, comprising a base-plate 26 and stepped side-pieces 27; to the steps of which latter are secured arms (not shown) for holding the carbon-sheets. Carbon-holders 25 for holding webs of various character, interleaved with carbons, are interchangeable on the standard 24. In order that any particular carbon-holder with its webs and carbons may be readily positioned upon, or removed from, the platform 24, the base-plates 26 of the carbon-holders are provided with pegs or pins 28 adapted to be set in the corresponding holes 29 in the platform 24. To remove the carbon-holder, it is simply necessary to lift the same from the platform; and to secure the same to the platform, it is merely necessary to lower the base-piece 26 thereon in such manner that the pins 28 enter the holes 29. The steps on the side-pieces 27 of the carbon-holder space the carbon-holding arms apart in such manner as to spread the plies of the web (which threads between said arms), as indicated at 30, so that the web-plies may have easy movement with respect to the carbons interleaved therewith. The carbons are of such length as to extend from the holding arms to the leading ends of the web-plies beyond the printing line, as indicated at 31, Figure 1.

In positioning the webs and carbons for the printing operation, slack is provided therein, as at 32, between the carbon-holder standard and the rear of the shelf 15 on the platen-carriage. This slack has the double function, hereinbefore mentioned, of permitting the typewriter carriage to have movement in letter-feed and return directions with respect to the carbon-holder, without drawing upon or tearing the webs or carbons; and of permitting the leading form-section of the web, with the carbons interleaved therewith, to have line-space feed with the platen while the rear ends of the carbons and the portion of the web back of the carbon-holder remain stationary. The amount of slack 32 in the webs and carbons may be accurately determined by the gage 21 in the operation of positioning the succeeding section of the web after the leading section thereof has been written in.

Assuming the web and carbons to be in the Figure 1 position for commencing the writing upon the leading web-section, the machine is operated in the usual manner until the desired writing on the leading section has been made. Thereupon the platen may be rotated in reverse direction by the usual hand-wheels (not shown) to cause the webs and carbons to be moved backwards on the shelf 15 until clear of the platen. When thus free of the platen, the plies of the web are seized by the fingers of the operator, and the leading ends of the web are drawn upward, along the under side of the gage-bar 20, toward the operator's head, until their leading edges are brought to the gage-piece 21. In this movement, the carbons and web are straightened out, first, to eliminate the slack 32; and, then, since the rear ends of the carbon-sheets are held at the carbon-holder, the straightened web-plies have a movement relative to the straightened carbons to clear the leading or written web-sections of the carbons, as indicated at 33 in Figure 2. The leading ends of the web-plies are then passed around under the platen in the rear thereof and up in front of the platen between the same and the knife 16; whereupon the leading web-sections 33, which are then free of the carbons, are severed from the web by drawing the latter against the knife, leaving the web and carbons a little below the position shown in Figure 1.

The usual front and rear pressure rolls 34 are provided for effecting the usual forward line-space feed and rearward web-ejecting operation. The pressure rolls 34 may, however, be released in the usual manner to permit the webs and carbons to be withdrawn rearward from the platen, without rotation of the latter, after the leading section has been written in, and to permit the replacement of the webs and carbons around the platen, without rotation of the latter, after the webs have been drawn to the Figure 2 position.

As already noted, a full web-form-section is indicated at 33 in Figure 2, between the gage-piece 21 and a dotted line 35. Other dotted lines 36, in Figure 2, define three other web-sections 37 to the rear of the leading section 33 and between the gage-piece 21 and the upper end 38 of the shelf 15. These three web-sections 37 constitute a length of web sufficient to provide the slack 32 behind the upper end of the shelf 15 when the webs and carbons are brought from Figure 2 position back to Figure 1 position. The gage 21 thus serves as a convenient means for determining the proper amount of slack to allow both for the line-space movement of the web in writing in the leading section thereof, and for the movement of the web back and forth with the carriage.

In order that that part of the web which overlies the shelf 15 may at all times have its edges in planes at right angles to the axis of the platen, and not be twisted or rocked askew, first to one side and then to the other, by the movement of the carriage with respect to the carbon-holder, a pair of side-edge gages or guards 39 is provided on the front of the paper-guide 15, near the upper rear edge thereof, at the side edges of the web. The web, when urged against either of these guards 39 by movement of the carriage, is held by such guard in centered position, so that such portion of the web as lies upon the shelf 15 is not appreciably disturbed by the carriage movement.

Recesses 40 in the shelf 15, one at either side thereof, and extending inward slightly beyond the edges of the web, are provided so that the operator may readily get one finger of each hand behind the under sheet to draw the web-plies to Figure 2 position. These recesses 40, besides saving time and trouble to the operator, prevent crumpling of the edges of the sheet and smudging of the fingers in the endeavor to get the fingers behind the lower sheet. As the web is to have movement relative to the carbon-sheets in being brought to Figure 2 position, and as it is desirable that the operator, once having seized the sheets, be not obliged to change his hold upon the same, the plies of the web are engaged by the operator beyond the side edges, indicated in dotted lines at 41, of the carbon-sheets. Direct pressure of the fingers on the carbon-sheets thus being avoided, the webs are easily moved with respect thereto. It will be noted that the recesses 40, although overlapping the side edges of the webs, do not extend to the side edges of the carbons. When, therefore, the webs are engaged through the recesses 40, the carbons cannot be pinched between the operator's fingers. The recesses 40, therefore, in a sense serve as gages for automatically determining the proper points for seizing the assembly of web-plies and carbons, to permit movement of the webs to the gage 21 with respect to the carbons and without risk of tearing the latter.

It will have been noted from the above that, except for the yoke 18 with its connected gage-bar 20, and gage 21, and the slight alteration of cutting suitable recesses 40 in apron 15, the mechanism of the typewriting machine is entirely unmodified in the adaption thereto of the continuous billing feature. It is not even necessary, however, that the standard typewriter be modified by the addition of the yoke 18 and gage in the use of the present invention. The gage-bar 20 may be secured to the carbon-holder standard and, as supported by the latter, be extended forward over the typewriting machine without any connection thereto.

Variations may be resorted to within the scope of the invention, and portions of the improvements may be used without others.

Having thus described my invention, I claim:

1. The combination in a typewriting machine having a rotary platen and a traveling carriage for moving the platen in letter-space and return directions, of a carbon-holder relatively to which the carriage travels, and means for line-feeding around the platen plies of web that are interleaved with carbons, said plies being threaded through the carbon-holder, said carbons being fastened at their rear ends to said carbon-holder, said carbon-holder and said traveling carriage being spaced apart and holding by its ends a loop or slack of web and carbons having sufficient surplus length both to provide a supply for the line-by-line feed around the platen of the leading form-section of the web during the typing operation, and also to allow for reciprocation of the carriage.

2. The combination in a typewriting machine having a rotary platen and a traveling carriage for moving the platen in letter-space and return directions, of a carbon-holder relatively to which the carriage travels, means for line-feeding around the platen plies of web that are interleaved with carbons. said plies being threaded through the carbon-holder, said carbons being fastened at their rear ends to said carbon-holder, said carbon-holder and said traveling carriage being spaced apart and holding by its ends a loop or slack of web and carbons having sufficient surplus length both to provide a supply for the line-by-line feed around the platen of the leading form-section of the web during the typing operation, and also to allow for reciprocation of the carriage, the web with the carbons being releasable from the platen preparatory to straightening out the web and pulling it forwardly relatively to the stationary carbons, and a leading-edge gage for the web, measuring the extent of shift of the web relatively to the carbons preparatory to typing the succeeding form.

3. The combination in a typewriting machine having a rotary platen and a traveling carriage for moving the platen in letter-space and return directions, of a carbon-holder relatively to which the carriage travels, and means for line-feeding around the platen plies of web that are interleaved with carbons, said plies being threaded through the carbon-holder, said carbons being fastened at their rear ends to said carbon-holder, said carbon-holder and said traveling carriage being spaced apart and holding by its ends a loop or slack of web and carbons having sufficient surplus length both to provide a supply for the line-by-line feed around the platen of the leading form-section of the web during the typing operation, and also to allow for reciprocation of the carriage, side guides for the web being provided on said carriage at the introductory side of the platen.

4. The combination with a typewriting machine having a rotary platen and a carriage, of a carbon-holder, means for effecting feed to and around the platen of the plies of an individual form-web interleaved with carbons secured to the carbon-holder, a paper-shelf on the carriage at the rear of the platen, the shelf having recesses extending from the side edges thereof to points beyond the positions thereon for the side edges of the web, and a gage-piece extending forward over the platen from above the shelf.

5. The combination with a typewriting machine having a rotary platen, a carriage for moving the platen in letter-space and return directions, releasable feed-rolls, and a rear paper-shelf, of a gage-piece supported upon and spaced above the paper-shelf and extending forward over the platen, and a carbon-holder spaced from the paper-shelf and adapted to guide a fan-fold web interleaved with carbon-sheets attached to the carbon-holder into position to be fed to and around the platen.

6. The combination with a typewriting machine, having a rotary platen and a carriage therefor, of a continuous billing attachment, including a stationary carbon-holder, a shelf on the carriage for guiding a continuous work-piece from said carbon-holder to the platen, the work-piece being releasable from the platen after a section thereof has been typed, and a gage-piece, carried by the shelf, normally extending forward over the platen from the shelf; along the underside of which gage-piece, the work-piece, upon such release, may be drawn a distance indicated by the gage, to advance the work-piece for typing of a succeeding section thereof.

7. The combination, in a typewriting machine, of a rotary platen, a traveling carriage, a carbon-holder fixed with respect to the carriage, said holder serving as a guide for continuous plies of an individual-form-web interleaved with the stationary carbons; and carbons secured to said holder; provision being made for a slack or loop of web and carbons between said stationary holder and said traveling carriage.

8. The combination, in a typewriting machine having a rotary platen and a traveling carriage, of a web-typing or continuous billing attachment including a carbon-holder, a shelf on the carriage for guiding to the platen continuous webs interleaved with the carbons secured to the carbon-holder, the webs being releasable and withdrawable from the platen after a section thereof has been typed, and a gage-piece normally extending forward of the platen, said carbon-holder and gage-piece being arranged in line, to permit the webs upon being released and removed from the platen to be straightened out along the gage to free the webs of the carbons sufficiently to permit relative shifting of carbons and webs.

9. The combination, in a typewriting machine having a rotary platen and a traveling carriage, of a continuous billing attachment including a stationary carbon-holder spaced rearward of the platen below the level thereof, means at the intake side of the platen for guiding thereto webs interleaved with the carbons that are secured to the holder, the webs being releasable and withdrawable from the platen after a section thereof has been typed, and a gage-piece normally extending forwardly and upwardly over the platen from the shelf, said carbon-holder, shelf and gage-piece being arranged to permit the webs, upon being released and removed from the platen, to be extended along the gage in substantially a straight line, to free the webs of the carbons, said gage-piece so placed as to leave sufficient excess length to form a loop or slack between the platen and the carbon-holder when the webs are reinserted around the platen for typing.

10. A typewriting machine of the character set forth, comprising a revoluble line-spacing platen, a carriage on which said platen is mounted, and a frame separated from and positioned in rear of said typewriter carriage, said frame having a web-guide or support, said frame and said support being stationary during the travel of the carriage and said support also having means for attachment of the rear ends of the carbon-sheets thereto, the carbon-sheets being interleaved between the plies of work-web which are guided through said support.

11. A typewriting machine of the character set forth, comprising a revoluble line-spacing platen, a carriage on which said platen is mounted, and a frame positioned in rear of said typewriter carriage and separated therefrom, said frame having a web-guide or support, said support also having means for attachment of the rear ends of the carbon-sheets thereto, the carbon-sheets being interleaved between the plies of work-web which are guided through said support, said carbon-attachment means comprising blades extending between the plies of work-web and mounted upon said support, the carbon-sheets being attached to said blades, said frame, support and blades being all stationary during the travel of the carriage.

12. In a typewriting machine for typing forms upon superposed plies of web, the combination with a platen and a letter-feeding carriage on which it is mounted, of means separated from and stationary during the travel of said carriage for conducting plies of work-web into the machine, a frame likewise stationary in rear of the carriage, said conducting means being provided upon said frame, and means provided upon said stationary frame for holding the rear portions of carbons which are interleaved between the plies of work-web and form therewith a composite web, provision being made for permitting the composite web to be supported in slack condition between the intake end of the machine and the platen.

13. A typewriting machine of the character set forth, comprising a revoluble line-spacing platen, means arranged at the intake side of the platen capable of supporting superposed plies of web in slack condition, means stationary while the carriage travels and during the rotation of the platen for detaining by their ends one or more carbon-sheets interleaved between the work-web plies and forming therewith a composite web, whereby the slack in the composite web is taken up by the line-feeding of the platen, said supporting means including means to permit the web to hang in a loop upon the machine, and a leading-edge gage mounted on said carriage to gage the extent to which the web is stripped or shifted relatively to the stationary carbons.

14. A typewriting machine of the character set forth, comprising a revoluble line-spacing platen, a carriage on which said platen is mounted, a frame positioned in rear of said typewriter-carriage, and stationary during the travel thereof, said frame having a web-guide or support, stationary means upon said frame for detaining by their ends one or more carbon-sheets interleaved between the work-web plies and forming therewith a composite web, whereby the slack in the composite web is taken up by the line-feeding of the platen, the loop or slack portion of the composite web extending forwardly between said web-guide and the platen, and a leading-edge gage mounted on said carriage above the platen to gage the extent to which the web may be stripped or shifted relatively to the stationary carbons.

15. A typewriting machine of the character set forth, comprising a revoluble line-spacing platen, a carriage on which said platen is mounted, a frame separated from and positioned in rear of said typewriter-carriage, said frame stationary during the carriage-travel and having a web-guide or support, and stationary means on said frame for detaining by their ends one or more carbon-sheets interleaved between the work-web plies and forming therewith a composite web, whereby the slack in the composite web is taken up by the line-feeding of the platen, the loop or slack portion of the composite web extending forwardly between said stationary web-guide and the traveling platen, said carriage having a paper-shelf in rear of the platen, and the loop of web occurring between said paper-shelf and said web-guide or support.

JESSE A. B. SMITH.